US012694124B2

(12) United States Patent
Charles et al.

(10) Patent No.: US 12,694,124 B2
(45) Date of Patent: Jul. 28, 2026

(54) VULNERABILITY REMEDIATION USING AN AUTONOMOUS ARTIFICIAL-INTELLIGENCE APPLICATION

(71) Applicant: Dell Products L.P., Round Rock, TX (US)

(72) Inventors: Peniel Charles, Bangalore (IN); Amudha Krishnasamy, Bangalore (IN); Manikandan Sethuraman, Bangalore (IN); Vighneshwar Hegde, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 87 days.

(21) Appl. No.: 18/650,029

(22) Filed: Apr. 29, 2024

(65) Prior Publication Data

US 2025/0335598 A1     Oct. 30, 2025

(51) Int. Cl.
*G06F 21/57* (2013.01)
*G06F 21/62* (2013.01)

(52) U.S. Cl.
CPC ........ *G06F 21/577* (2013.01); *G06F 21/6218* (2013.01)

(58) Field of Classification Search
CPC ........................... G06F 21/577; G06F 21/6218
See application file for complete search history.

(56) References Cited

U.S. PATENT DOCUMENTS

| | | | | |
|---|---|---|---|---|
| 8,706,762 | B1 * | 4/2014 | Patzer ................. | G06F 16/9535 |
| | | | | 707/790 |
| 11,100,146 | B1 * | 8/2021 | Brest ................... | G06F 16/3329 |
| 11,252,178 | B1 * | 2/2022 | Malveaux .......... | H04L 63/1433 |
| 11,327,828 | B2 * | 5/2022 | Purushothaman .. | G06F 11/0787 |
| 11,429,473 | B2 * | 8/2022 | Hecox ................ | G06F 11/3051 |
| 12,003,527 | B2 * | 6/2024 | Yadav ................ | H04L 63/1433 |
| 2013/0073704 | A1 * | 3/2013 | Whitlock ............... | G06F 21/46 |
| | | | | 709/223 |
| 2017/0075793 | A1 * | 3/2017 | Tahboub ............. | G06F 11/3698 |
| 2018/0150348 | A1 * | 5/2018 | Hecox ................ | G06F 11/0793 |
| 2019/0075081 | A1 * | 3/2019 | Adam ..................... | H04L 63/20 |
| 2020/0242253 | A1 * | 7/2020 | Noel ..................... | G06F 21/577 |
| 2021/0209076 | A1 * | 7/2021 | Gandi ................. | G06F 11/3452 |
| 2022/0035938 | A1 * | 2/2022 | Carmichael ............. | H04L 63/20 |
| 2022/0222350 | A1 * | 7/2022 | Franzen ................ | G06F 11/321 |
| 2023/0040047 | A1 * | 2/2023 | Gadepalli ................ | G06F 8/65 |
| 2025/0245341 | A1 * | 7/2025 | Malik .................... | G06F 21/577 |
| 2025/0298582 | A1 * | 9/2025 | Mordovtsev ........... | G06N 3/098 |
| 2025/0323954 | A1 * | 10/2025 | Vaiente ................. | H04W 12/50 |
| 2025/0335598 | A1 * | 10/2025 | Charles ................. | G06F 21/577 |

* cited by examiner

*Primary Examiner* — Meng Li

(74) *Attorney, Agent, or Firm* — Fogarty LLP

(57) ABSTRACT

A system and method for vulnerability redemption is disclosed. The method comprises extracting vulnerability details from a vulnerability report regarding an affected host, constructing a bot query based on the vulnerability details, receiving a vulnerability resolution script from a bot in response to the bot query, triggering execution of the vulnerability resolution script on the affected host, receiving an indication of successful execution of the vulnerability resolution script on the affected host, and saving the vulnerability resolution script to a remediation database.

16 Claims, 8 Drawing Sheets

401

```
EXTRACTING KEY WORDS FROM VULNERABILITY ANALYSIS REPORT
‒ ‒ ‒ ‒ ‒ ‒ ‒ ‒ ‒ ‒ ‒ ‒ ‒ ‒ ‒
IP ADDRESS: 10.224.242.195
OPERATING SYSTEM: RHEL 7.5
VULNERABILITY DETAIL: SSH BIRTHDAY ATTACKS ON 64-BIT BLOCK CIPHERS (SWEET32)
SOLUTION: DISABLE SSH SUPPORT FOR 3DES CIPHER SUITE
```

```
GENERATING QUERY FOR BOT

‒ ‒ ‒ ‒ ‒ ‒ ‒ ‒ ‒ ‒ ‒ ‒ ‒ ‒ ‒

PYTHON CODE TO LOGIN TO REMOTE LINUX MACHINE BY TAKING IP, USERNAME,
PASSWORD AS COMMAND LINE PARAMS AND DISABLE SSH SUPPORT FOR 3DES
CIPHER SUITE IN RHEL 7.5 AND VERIFY FIX
```

```
VERIFYING EXISTING SOLUTION IN REMEDIATION ENGINE
‒ ‒ ‒ ‒ ‒ ‒ ‒ ‒ ‒ ‒ ‒ ‒ ‒ ‒ ‒
QUERY WAS NOT FOUND IN THE DICTIONARY.
```

```
QUERYING BOT (CHATGPT)
– – – – – – – – – – – – – – –
HERE IS A PYTHON CODE EXAMPLE THAT USES THE 'PARAMIKO' LIBRARY TO LOGIN
TO A REMOTE LINUX MACHINE OVER SSH, TAKES THE IP ADDRESS, USERNAME,
AND PASSWORD AS COMMAND LINE PARAMETERS. IT THEN EXECUTES A
COMMAND TO DISABLE SSH SUPPORT FOR THE 3DES CIPHER SUITE ON THE
REMOTE MACHINE . FINALLY, IT VERIFIES THE FIX BY CHECKING THE SSH
SERVER'S CONFIGURATION FILE:
' ' ' PYTHON
IMPORT SYS
IMPORT PARAMIKO

DEF DISABLE_3DES_CIPHER(IP, USERNAME. PASSWORD):
  TRY:
# CONNECT TO THE REMOTE MACHINE
CLIENT = PARAMIKO.SSHCLIENT()
CLIENT.LOAD_SYSTEM_HOST_KEYS()
CLIENT.SET_MISSING_HOST_KEY_POLICY(PARAMITO.AUTOADDPOLICY())
CLIENT.CONNECT(IP, USERNAME=USERNAME, PASSWORD=PASSWORD)

# EXECUTE THE COMMAND TO DISABLE 3DES CIPHER IN RHEL 7.5
COMMAND = "SED -I 'S/CIPHERS.*3DES.*/CIPHERS AES128-CTR, AES192-CTR,
AES256-CTR/' /ETC/SSH/SSHD_CONFIG && SYSTEMCTL RESTART SSHD"
STDIN, STDOUT, STDERR = CLIENT.EXEC_COMMAND(COMMAND)

IF LEN(SYS.ARGV) !=4:
    PRINT("USAGE: PYTHON SCRIPT.PY IP_ADDRESS USERNAME PASSWORD")
ELSE:
    IP_ADDRESS = SYS.ARGV[1]
    USERNAME = SYS.ARGV[2]
    PASSWORD = SYS.ARGV[3]
    DISABLE_3DES_CIPHER(IP_ADDRESS, USERNAME, PASSWORD)
```

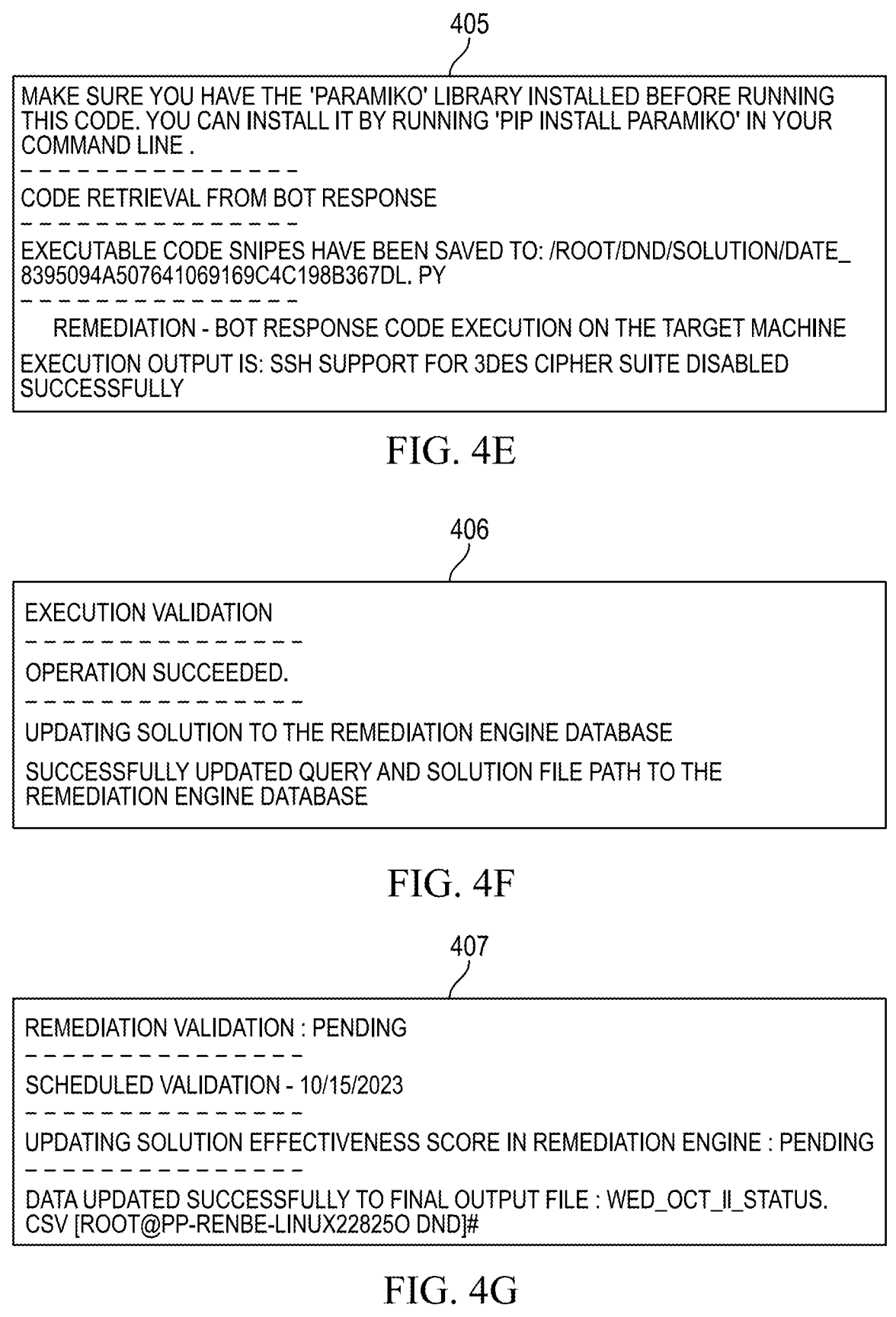

MAKE SURE YOU HAVE THE 'PARAMIKO' LIBRARY INSTALLED BEFORE RUNNING THIS CODE. YOU CAN INSTALL IT BY RUNNING 'PIP INSTALL PARAMIKO' IN YOUR COMMAND LINE .

CODE RETRIEVAL FROM BOT RESPONSE

EXECUTABLE CODE SNIPES HAVE BEEN SAVED TO: /ROOT/DND/SOLUTION/DATE_8395094A507641069169C4C198B367DL. PY

REMEDIATION - BOT RESPONSE CODE EXECUTION ON THE TARGET MACHINE

EXECUTION OUTPUT IS: SSH SUPPORT FOR 3DES CIPHER SUITE DISABLED SUCCESSFULLY

EXECUTION VALIDATION

OPERATION SUCCEEDED.

UPDATING SOLUTION TO THE REMEDIATION ENGINE DATABASE

SUCCESSFULLY UPDATED QUERY AND SOLUTION FILE PATH TO THE REMEDIATION ENGINE DATABASE

REMEDIATION VALIDATION : PENDING

SCHEDULED VALIDATION - 10/15/2023

UPDATING SOLUTION EFFECTIVENESS SCORE IN REMEDIATION ENGINE : PENDING

DATA UPDATED SUCCESSFULLY TO FINAL OUTPUT FILE : WED_OCT_II_STATUS. CSV [ROOT@PP-RENBE-LINUX228250 DND]#

FIG. 4G

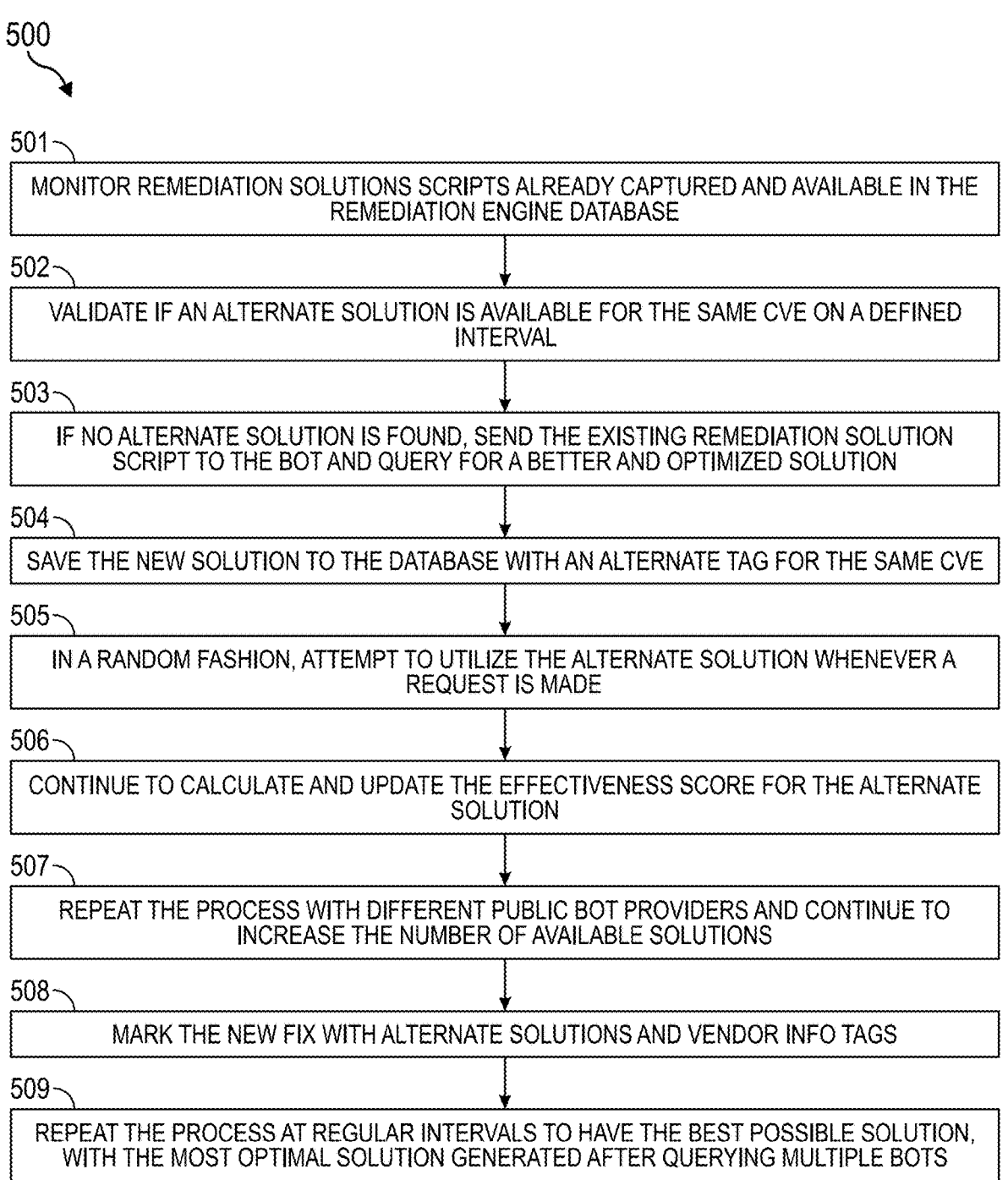

500

501
MONITOR REMEDIATION SOLUTIONS SCRIPTS ALREADY CAPTURED AND AVAILABLE IN THE REMEDIATION ENGINE DATABASE

502
VALIDATE IF AN ALTERNATE SOLUTION IS AVAILABLE FOR THE SAME CVE ON A DEFINED INTERVAL

503
IF NO ALTERNATE SOLUTION IS FOUND, SEND THE EXISTING REMEDIATION SOLUTION SCRIPT TO THE BOT AND QUERY FOR A BETTER AND OPTIMIZED SOLUTION

504
SAVE THE NEW SOLUTION TO THE DATABASE WITH AN ALTERNATE TAG FOR THE SAME CVE

505
IN A RANDOM FASHION, ATTEMPT TO UTILIZE THE ALTERNATE SOLUTION WHENEVER A REQUEST IS MADE

506
CONTINUE TO CALCULATE AND UPDATE THE EFFECTIVENESS SCORE FOR THE ALTERNATE SOLUTION

507
REPEAT THE PROCESS WITH DIFFERENT PUBLIC BOT PROVIDERS AND CONTINUE TO INCREASE THE NUMBER OF AVAILABLE SOLUTIONS

508
MARK THE NEW FIX WITH ALTERNATE SOLUTIONS AND VENDOR INFO TAGS

509
REPEAT THE PROCESS AT REGULAR INTERVALS TO HAVE THE BEST POSSIBLE SOLUTION, WITH THE MOST OPTIMAL SOLUTION GENERATED AFTER QUERYING MULTIPLE BOTS

FIG. 5

VULNERABILITY REMEDIATION USING AN AUTONOMOUS ARTIFICIAL-INTELLIGENCE APPLICATION

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Security information and event management systems are deployed to facilitate security-related operations in data processing systems, especially in large systems that may constitute, for example, a data center comprising many IHSs. The Security information and event management system collects security-related data from the data processing system, such as data from event logs describing detected activities in the system that may have security implications, and assists security-focused personnel in carrying out security procedures. These may include real-time monitoring of a system to detect and neutralize attacks or threats, mine historical data for auditing or forensic purposes, and analyze the data processing system for security vulnerabilities in the interest of improving system security.

A user may obtain information regarding the vulnerability of system components (e.g., IHSs) to a particular kind of attack. For example, the attack might be associated with an event appearing in an event log. Based on the vulnerability information, the user may conduct an analysis to identify how to reduce the vulnerability.

SUMMARY

Embodiments are directed to a system that generates queries with details about system vulnerabilities and interacts with an internal or external bot to generate a vulnerability remediation code fix. The system implements a filtering and curation process to eliminate low-quality responses and to include more accurate results in a remediation engine database. The remediation responses may be graded based on various success criteria. Prior solutions usually required manual intervention for vulnerability responses. Obtaining proposed solutions from bots as described herein can improve the quality of the solutions.

In one embodiment, vulnerability redemption comprises extracting vulnerability details from a vulnerability report regarding an IHS, constructing a bot query based on the vulnerability details, receiving a vulnerability resolution script from a bot in response to the bot query, triggering execution of the vulnerability resolution script on the IHS, receiving an indication of successful execution of the vulnerability resolution script on the IHS, and saving the vulnerability resolution script to a remediation database.

The method may further comprise receiving an indication of failure of the resolution script from the IHS, constructing a revised bot query with resolution script failure details, receiving an updated vulnerability resolution script from the bot in response to the revised bot query, triggering execution of the updated vulnerability resolution script on the IHS, and receiving the indication of successful execution in response to the updated vulnerability resolution script.

The vulnerability details may comprise one or more of: an affected IHS name, an affected IHS IP address, operating system information, recommended fix details for remediation of the vulnerability. The vulnerability details may identify risks of one or more cyber attacks, exploits, or malware directed at the IHS.

The method may further comprise performing multiple iterations of constructing revised bot queries, receiving updated vulnerability resolution scripts, and triggering execution of the updated vulnerability resolution scripts on the IHS until the indication of successful execution of the vulnerability resolution script is received.

The method may further comprise checking the remediation database for a resolution script associated with the bot query or the vulnerability details.

The method may further comprise updating the remediation database with one or more of: an indication of execution success or failure, time taken for execution of the resolution script, and disruptive actions on the IHS associated with execution of the resolution script.

The method may further comprise calculating a solution effectiveness score for the vulnerability resolution script.

BRIEF DESCRIPTION OF THE DRAWINGS

Figure 1:
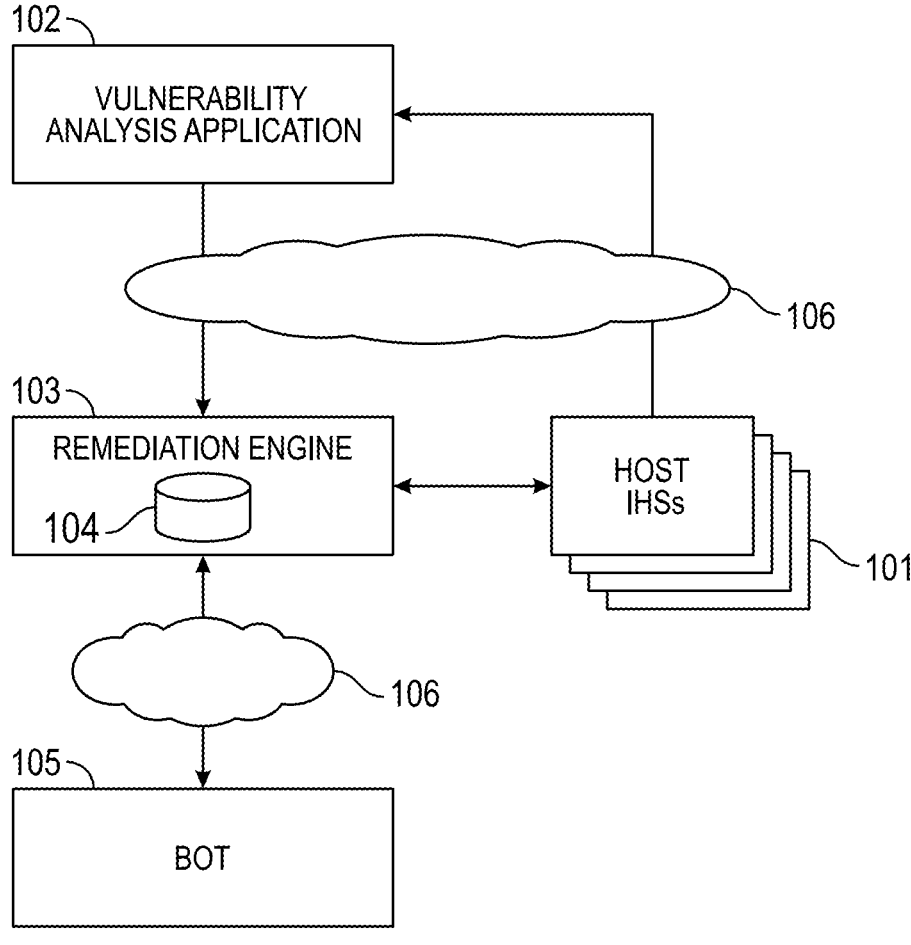

Having thus described the invention in general terms, reference will now be made to the accompanying drawings, which are not necessarily drawn to scale, and wherein:

FIG. 1 is a high-level block diagram of a system for vulnerability remediation using an autonomous artificial-intelligence application.

Figure 2:
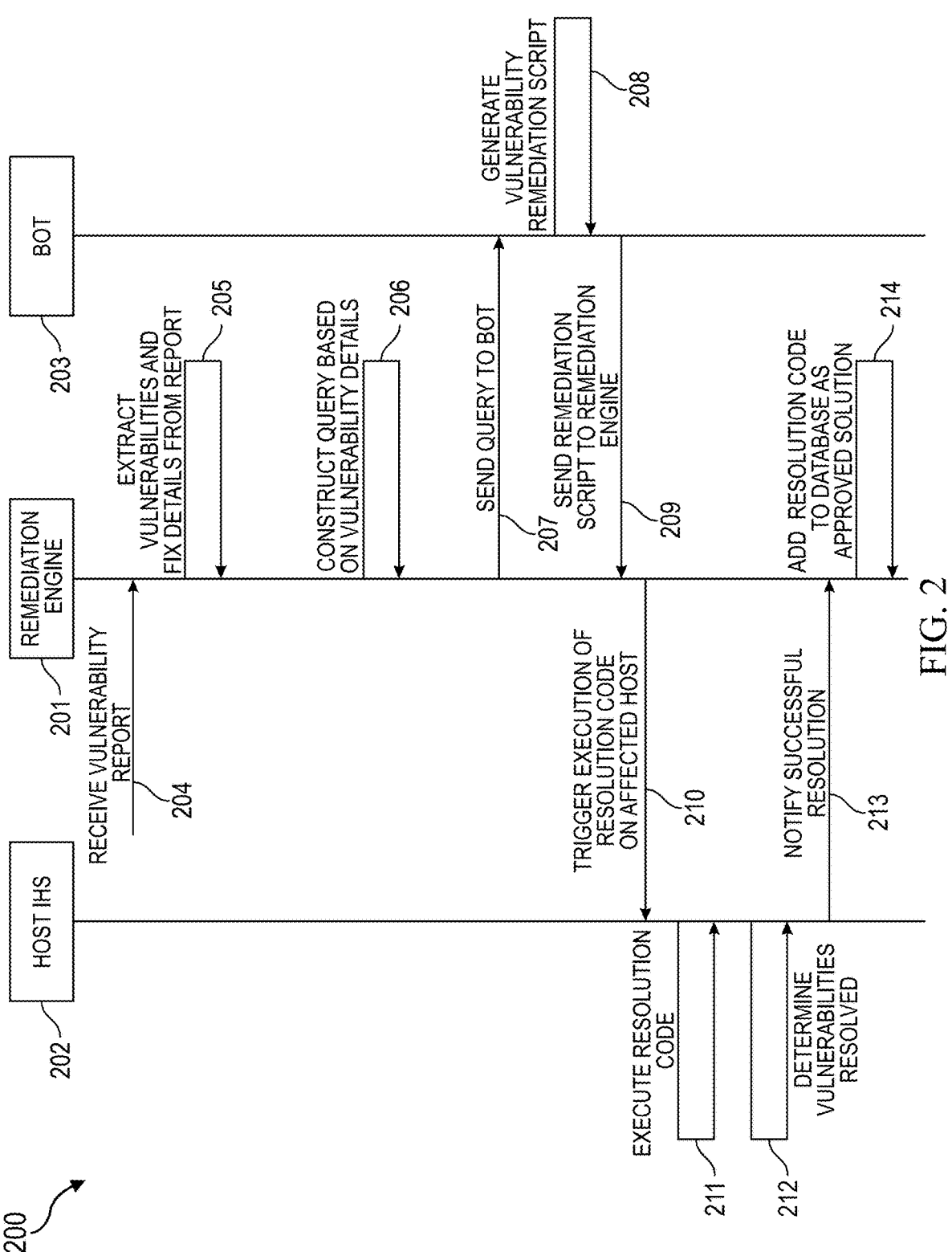

FIG. 2 is a flowchart illustrating messages exchanged between components of a vulnerability remediation system and operations performed by those components.

Figure 3:
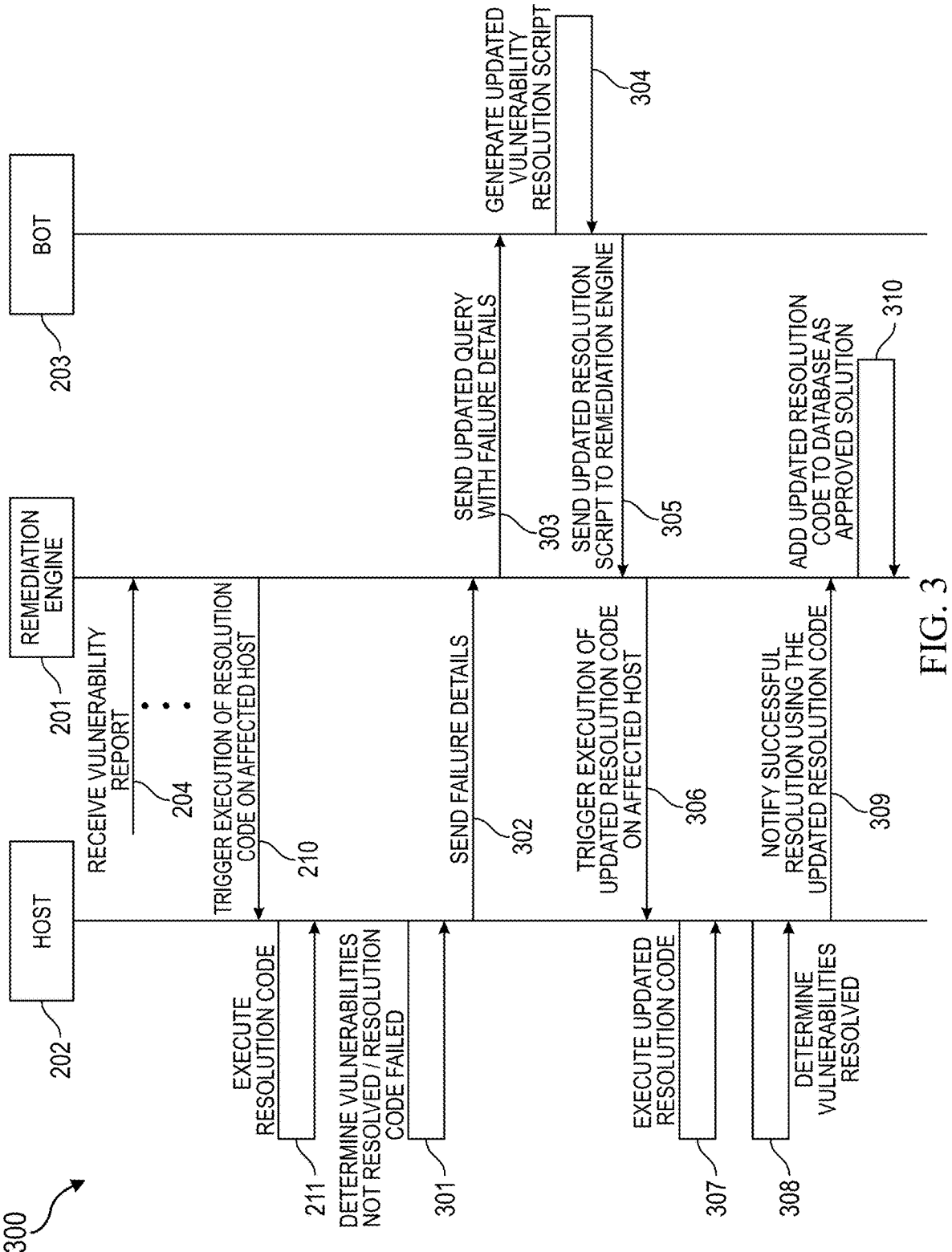

FIG. 3 is a flowchart illustrating messages exchanged between the components of the vulnerability remediation system and operations performed by those components when the resolution codes fails.

FIGS. 4A-G illustrate a high-level workflow of messages, queries, and coding used in an example resolution to a host vulnerability.

FIG. 5 is a flowchart illustrating an example process to train the remediation engine to fine-tune the vulnerability solutions.

Figure 6:
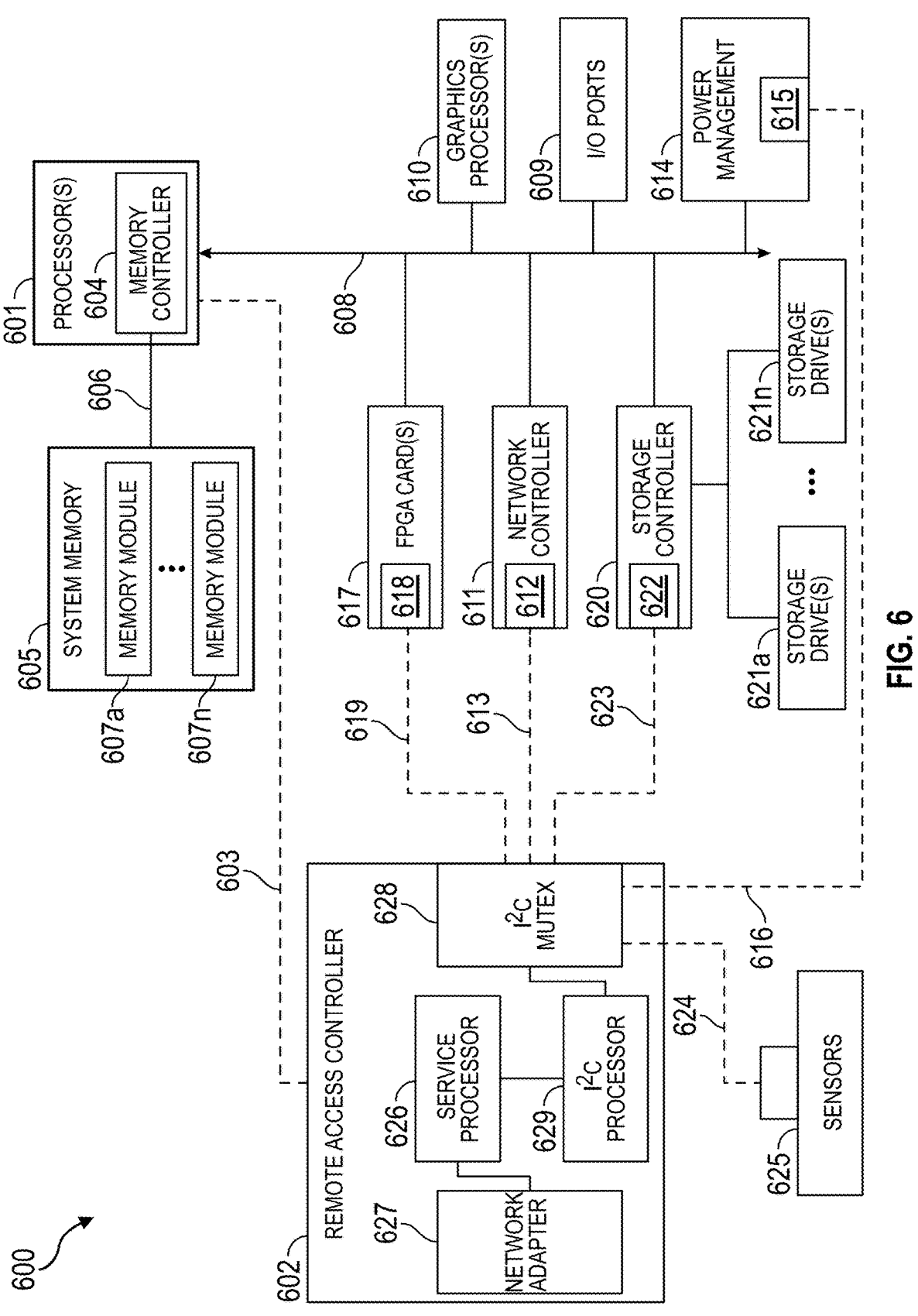

FIG. 6 shows an example of an IHS configured to implement systems and methods described herein for providing a remediation engine for fixing vulnerabilities in a computing system or other IHS.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The embodiments disclosed herein provide bot-powered vulnerability remediation with a scoring mechanism for effective filtering and a curing process to eliminate low-quality responses bot responses. The bot may be an autonomous artificial-intelligence (AI) application, such as a chatbot, ChatGPT, or any AI-powered software program designed to engage in natural language conversations with users, provide information, answer questions, and perform tasks.

Users and administrators desire to provide a secure IHS environment that is free of vulnerabilities. With existing tools, users and administrators are usually able to detect vulnerabilities quickly; however, remediation of the vulnerabilities is usually a time-consuming task. Vulnerability analysis applications, such as Kenna reports, list the number of instances of each vulnerability in an IHS environment, each vulnerability's potential severity, and the IHS assets that are threatened by each vulnerability. The vulnerability analysis applications may provide recommended actions listing possible fixes for each vulnerability. When there are large volume of vulnerabilities, the remediations are likely to be time consuming and challenging to implement. Furthermore, proposed fixes shared by vulnerability analysis applications are generic. Hence, those solutions cannot be applied directly. The users or administrator may need to modify proposed fix procedures for a specific operating system (OS) or kernel. In some cases, the vulnerabilities may be related to IHS components or configurations. In other cases, the vulnerabilities are related to third-party software, and administrators or users may require additional procedures to address these third-party vulnerabilities.

FIG. 1 is a high-level block diagram of a system for vulnerability remediation using an autonomous artificial-intelligence application. One or more host IHSs 101, such as a number of servers in a datacenter, are analyzed by or provide information to a vulnerability analysis application 102. The information from the host IHSs 101 may include, for example, security data from scanners, penetration testing, and application security testing tools. The vulnerability analysis application 102 analyzes the security data to determine a risk score for each unique vulnerability, asset, and group of assets in host IHSs 101. The risk score is provided with asset and vulnerability information (i.e., a vulnerability report) to a remediation engine 103. In an example embodiment, the asset and vulnerability information is a Kenna report. In other embodiments, any other risk-based vulnerability management software solution may provide a report to the remediation engine 103.

The remediation engine 103 extracts details from the vulnerability report, such as the affected host IHS 101 name or IP address, vulnerability details, OS information, and possible fix details for remediation of the vulnerability. Remediation engine 103 may check a database 104 of resolution code options for the vulnerabilities identified in the vulnerability report. If no options are available in database 104, then remediation engine 103 the constructs a query based on the details obtained in the vulnerability report. Database 104 may be hosted by remediation engine 103 itself or may be located at a remote location or IHS that is accessible to the remediation engine.

The query is sent to a bot 105, which may be an internal bot (i.e., local to a datacenter hosting IHSs 101) or an external bot such as ChatGPT. The queries can be sent via REST calls in an example embodiment. The bot 105 is any AI-powered software program designed to engage in natural language conversations with users, such as by accepting a text query from remediation engine 103, and to provide information, answer questions, or perform tasks in response to the query.

Bot 105, with the help of its AI algorithm, generates a vulnerability remediation script using the information in the query. Bot 105 then send the script to the remediation engine 103. Remediation engine 103 triggers the vulnerability remediation script on the affected host IHS 101 and waits for execution results. On successful execution of the remediation script, the host IHS 101 returns a success code to remediation engine 103. The remediation engine 103 may then save the successful remediation script to database 104 for use when other IHSs 101 have similar vulnerabilities. The successful remediation script may be added to database 104 with a weight or score assigned. The weight or score may be based, for example, on the complexity of the remediation script, the number of attempts required to develop the remediation script, etc.

In case of execution failure of the remediation script, the affected host IHS 101 returns a failure summary and/or error codes to remediation engine 103. These failure summary and error codes are then sent back to bot 105 for a refined remediation solution. The refined remediation solution is sent to remediation engine 103, which again attempt to fix the vulnerability by sending the refined remediation solution to the affected host IHS 101. and the same is tried again on the affected host. If the refined remediation solution is successful and has fixed the vulnerability, then it is as an approved remediation solution to database 104 by remediation engine 103 with details of the vulnerability, executed OS versions, and any other relevant parameters. In the case that failure of various remediation scripts are seen after multiple iterations, the solution for the vulnerability is marked as "not available" by remediation 103.

A curation process removes irrelevant or low-quality responses from AI bot 105. Remediation scripts generated using AI bot 105 are prioritized by remediation engine 103 based on success rate. Any new asset remediation for the same vulnerabilities are serviced from the curated solutions, such as previously successful remediation scripts stored in database 104.

In various embodiments, the host IHSs 101, vulnerability analysis application 102, remediation engine 103, and bot 105 may be collocated, such as within a datacenter, or may be distributed so that some or all of the components are in different locations. The host IHSs 101, vulnerability analysis application 102, remediation engine 103, and bot 105 may communicate with each other across one or more public or private networks 106, such as an intranet, the Internet, a local-area network (LAN), or a wireless local-area network (WLAN).

FIG. 2 is a flowchart illustrating messages exchanged between components of a vulnerability remediation system and operations performed by those components. A remediation engine 201 communicates with a host IHS 202 and a bot 203. At 204, remediation engine 201 receives a vulnerability report. The vulnerability report may be received from a vulnerability analysis application, such as a Kenna report. At 205, remediation engine extracts details from the vulnerability report with information related to vulnerabilities and a fix summary for host IHS 202. At 206, remediation engine 201 generates a query with the vulnerability details, fix summary, OS version of the affected host IHS 202. At 207, remediation engine 201 sends the query to bot 203.

Bot 203 may be a chatbot, such as ChatGPT or other autonomous AI-based software program. At 208, bot 203 uses information in the query from remediation engine 201 to generate resolution code or script to address the vulnerability identified for host IHS 202. At 209, bot 203 sends the resolution script to remediation engine 201. At 210, remediation engine 201 triggers execution of the resolution code on affected host IHS 202.

At 211, host IHS 202 executes the resolution code and evaluates whether the vulnerability was successfully addressed. At 212, host IHS 202 determines that the vulnerabilities were resolved. At 213, host IHS 202 notifies remediation engine 201 that the resolution code was successful. At 214, remediation engine 201 adds the successful resolution code as an approved solution to the vulnerability. Remediation engine 201 may assign a predefined weight or scoring to the resolution code.

FIG. 3 is a flowchart 600 illustrating messages exchanged between the components of the vulnerability remediation system of FIG. 2 and operations performed by those components when the resolution codes fails. In flowchart steps 204 to 211 are preformed as noted in FIG. 2. However, at 601, after host IHS 202 executes the initial resolution code it determines that the initial resolution code failed to resolve the vulnerabilities. At 602, host IHS 202 sends failure details related to the initial resolution code to remediation engine 201.

At 303, remediation engine 201 sends the failure details to bot 203. At 604, bot 203 generates an updated vulnerability resolution script using the failure details. At 605 bot 203 sends the updated resolution script to the remediation engine 201. At 606, remediation engine 201 triggers execution of the updated resolution code on affected host IHS 202.

At 607, host IHS 202 executes the updated resolution code and evaluates whether the vulnerability was successfully addressed. At 608, host IHS 202 determines that the vulnerabilities were resolved using the updated resolution script. At 609, host IHS 202 notifies remediation engine 201 that the updated resolution code was successful suing the updated resolution script. At 610, remediation engine 201 adds the successful updated resolution script as an approved solution to the vulnerability. Remediation engine 201 may assign a predefined weight or scoring to the updated resolution script. The weight or scoring may be determined by the number of vulnerabilities addressed, the number of updated resolution script attempts that were required to resolve the vulnerability, applicability of the updated resolution script to other vulnerabilities, etc.

In other embodiments the first attempt at using an updated resolution script may fail at 607. In that situation, the process flow may return to 601 and the updating process at 601-607 may be repeated with a second or further updated resolution script that includes the additional failure details collected while trying to apply the initial updated resolution script at 607. This updating process 601-607 may cycle a predetermined number to times as set by remediation engine 201 and/or until bot 203 has no further suggestions for updates to the resolution script.

The query 207 or updated query 303 do not require sensitive information and, therefore, should not present a security risk to the system. Once a working is identified, the database 104 in the remediation engine 103 gets updated with the successful query and resolution. The database 104 is used to address future vulnerabilities, which allows the system to avoid the need to query the bot 105 again to address the same vulnerabilities seen on different assets 101. Instead, the solutions are consumed from remediation engine 103 itself. While ChatGPT is referred to in some examples, bot 105 may be any available bot internal or external. Preferably, bot 105 has API support to posting queries from remediation engine 103. The remediation engine 103 may use AI-based services or chatbots, such as Codeium or Microsoft CoPilot to sanitize responses (209, 605) from bot 105 before triggering the resolution code on the host IHS 101. The remediation engine 103 may implement a filtering or curation process to eliminate low-quality responses and to have more accurate results database 104. The effectiveness of the resolution code is based on the quality of the query generated by the remediation engine 103. For cases that encounter failures or misleading information from the bot 105, the updated resolution code process illustrated in FIG. 3 allows remediation engine 103 to improve the query using the failure details in an attempt to get the correct resolution code.

FIGS. 4A-G illustrate a high-level workflow of messages, queries, and coding used in an example resolution to a host vulnerability. At 401, the remediation engine receives a vulnerability analysis report, such as a Kenna report, for a particular host IHS and extracts key words from the report. Key words may include, for example, the host IP address, the operating system on the host, vulnerability details, and proposed solutions. At 402, the remediation engine constructs a query for the bot, such as a query to ChatGPT based on inputs from the vulnerability report. The query may request, for example, code to execute the proposed solution from the vulnerability report. At 403, the remediation engine verifies whether the query (or a similar query) was already saved to a remediation database and/or whether a related vulnerability remediation script is already available to the remediation engine.

At 404, a remediation script is received at the remediation engine from the bot in response to the query. The script may include, for example, Python code for implementing the vulnerability solution on a Linux machine. In other examples, any appropriate type of code or script may be provided by the bot for a particular host OS identified in the query. At 405, the remediation engine causes the affected host IHS to execute the remediation script received from the bot.

At 406, the remediation engine receives validation of the script execution and confirmation of a successful result. The remediation engine then updates the solution to the remediation database for use to address future incidents where the vulnerability is found in other host IHSs. At 407, remediation validation may occur on a subsequent vulnerability analysis. The remediation script may also be assigned an effectiveness score or other weighting based upon the solution effectiveness.

The bot-generated script may be rated based on factors that determine the solution's accuracy and efficiency. Once the remediation solution script is obtained from the bot and is triggered on the affected host, the following parameters may be captured and updated in the remediation engine's solution database: execution success or failure, time taken for execution, and disruptive actions, if any, such as host reboot, service or application restarts, user logout, etc. The remediation validation may be initiated process by triggering a vulnerability scanner, such as a Kenna scan using API. If validation is successful, then the solution is updated in the remediation engine database with the following parameters: platform and OS type, set the number of platforms supported to 1, and set the number of times the solution is utilized to remediate to 1. The number of platforms supported and the number of times the solution was utilized can be incremented each time the solution is used again. Based on updated values, a solution effectiveness score can be calculated in the remediation engine.

In an example embodiment, consider a 3DES (Triple Data Encryption Algorithm) fix for a Windows® platform updated with the following values in the remediation database:

Time taken to execute the remediation solution script: 2 min

Does the remediation process involve host reboot: Yes

Number of platforms supported: 1

Number of times the solution was utilized: 1

Assign an execution time score, if execution time is:

< than 1 minute, assign 20 points;

< than 5 minutes, assign 10 points; or

> than 5 minutes, assign 5 points.

Assign a score for disruption:

If no reboot is required. assign 20 points;

If one reboot is required, assign 10 points; or

If multiple reboots are required, assign 0 points.

Similarly,

If any service restart is required, assign 10 points; or

For user logout operation requirements, assign 5 points

Assign platform supported score:

If one platform is supported, assign 5 points;

If multiple versions are supported in one platform, assign 2 points for each version; or If multiple platforms are supported, assign additional 5 points for each platform.

Assign solution utilization score:

If the solution was utilized only once, assign 5 points;

For further utilizations, assign 1 point for each cycle;

If the solution is utilized on multiple platforms, assign 5 points for each platform; and For further utilization, assigns 1 point for each cycle.

Using the individual scores described above, a remediation effectiveness score can be calculated:

$$\text{Effectiveness Score}=(\text{Execution time score}+\text{Disruption score}+\text{Platform supported score}+\text{Solution utilization score})$$

The effectiveness score can be recalculated and updated after each remediation. A higher effectiveness score infers that the solution is proven and more reliable for remediation.

FIG. 5 is a flowchart 500 illustrating an example process to train the remediation engine to fine-tune the vulnerability solutions. At 501, the remediation engine monitors remediation solutions scripts that are already captured and available in a remediation database. At 502, the remediation engine validates if an alternate solution is available for a particular CVE (Common Vulnerabilities and Exposures) at defined intervals. At 503, if no alternate solution is found at 502, then the remediation engine sends the existing remediation solution script to the bot and queries the bot for a better and optimized solution.

At 504, the remediation engine saves the new solution to the database with an alternate tag for the same CVE. At 505, in a random fashion, the remediation engine attempts to utilize the alternate solution whenever a request is made to fix the same CVE. At 506, the remediation engine calculates and updates an effectiveness score for the alternate solution as described above.

At 507, the remediation engine repeats the process at steps 503-506 using different public bots, such as ChatGPT, Google Bard, Microsoft CoPilot, Claude, etc., and continues to increase the number of available solutions in the remediation database. At 508, the remediation engine marks new fixes and alternate solutions with vendor info tags. At 509, the remediation engine repeats the process at steps 501-508 at regular intervals to seek the best possible solutions. The most optimal solutions will be generated after querying multiple bots.

FIG. 6 shows an example of an IHS 600 configured to implement systems and methods described herein for providing a remediation engine for fixing vulnerabilities in a computing system or other IHS. IHS 600 may also be used as a host IHS that is analyzed for vulnerabilities and that requires a vulnerability solution. IHS 600 may further be used to host and support an autonomous artificial-intelligence application, chatbot, or other public or private bot or AI-based application. It should be appreciated that although the embodiments described herein may describe an IHS that is a compute sled, server, or similar computing component that may be deployed within a rack-mounted chassis, other embodiments may be utilized with other types of IHSs.

IHS 600 may be a compute sled, such as compute that may be installed within a datacenter that may in turn be installed within a rack. Installed in this manner, IHS 600 may utilize shared power, network and cooling resources provided by the datacenter and/or rack. IHS 600 may utilize one or more processors 601. In some embodiments, processors 601 may include a main processor and a co-processor, each of which may include a plurality of processing cores that, in certain scenarios, may be used in operating multiple virtualized computing environments. In certain embodiments, one or all of processor(s) 601 may be graphics processing units (GPUs) in scenarios where IHS 600 has been configured to support functions such as multimedia services and graphics applications.

In some embodiments, processor 601 may be configured to operate as a source of telemetry data providing physical sensor data, such as junction temperatures and power consumption. Processor 601 may also be configured to operate as a source logical telemetry data, such as remaining CPU processing capacity. In some embodiments, processor 601 may be configured by remote access controller 602 to generate telemetry data that is reported to the remote access controller, where the configuration and reporting of this telemetry data may be via a PECI (Platform Environment Control Interface) bus 603.

As illustrated, processor(s) 601 includes an integrated memory controller 604 that may be implemented directly within the circuitry of the processor 601, or the memory controller 604 may be a separate integrated circuit that is located on the same die as the processor 601. The memory controller 604 may be configured to manage the transfer of data to and from the system memory 605 of the IHS 600 via a high-speed memory interface 606. In some embodiments, memory controller 604 may be configured to operate as a source of telemetry data capable of generating reports that are reported to remote access controller 602. The telemetry data reported by memory controller 604 may include metrics such as the amount of available system memory 605 and memory transfer rates via memory interface 606.

The system memory 605 is coupled to processor(s) 601 via a memory bus 606 that provides the processor(s) 601 with high-speed memory used in the execution of computer program instructions by the processor(s) 601. Accordingly, system memory 605 may include memory components, such as static RAM (SRAM), dynamic RAM (DRAM), or NAND Flash memory, suitable for supporting high-speed memory operations by the processor(s) 601. In certain embodiments, system memory 605 may combine both persistent, non-volatile memory and volatile memory. In certain embodiments, the system memory 605 may be comprised of multiple removable memory modules. The system memory 605 of the illustrated embodiment may include removable memory modules 607a-n. Each of the removable memory modules 607a-n may correspond to a printed circuit board memory socket that receives a specific type of removable memory module 607a-n, such as a DIMM (Dual In-line Memory Module), that can be coupled to the socket and then decoupled from the socket as needed, such as to upgrade memory capabilities or to replace faulty components. Other embodiments of IHS system memory 605 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 600 may utilize a chipset that may be implemented by integrated circuits that are connected to each processor 601. All or portions of the chipset may be implemented directly within the integrated circuitry of an individual processor 601. The chipset may provide the processor(s) 601 with access to a variety of resources accessible via one or more buses 608. Various embodiments may utilize any number of buses to provide the illustrated pathways served by bus 608. In certain embodiments, bus 608 may include a PCIe (PCI Express) switch fabric that is accessed via a PCIe root complex. IHS 600 may also include one or more I/O ports 609, such as PCIe ports, that may be used to couple the IHS 600 directly to other IHSs, storage resources or other peripheral components.

In certain embodiments, a graphics processor 610 may be comprised within one or more video or graphics cards, or an embedded controller, installed as components of the IHS 600. In certain embodiments, graphics processor 610 may be an integrated of the remote access controller 602 and may be utilized to support the display of diagnostic and administrative interfaces related to IHS 600 via display devices that are coupled, either directly or remotely, to remote access controller 602.

In the illustrated embodiments, processor(s) 601 is coupled to a network controller 611, such as provided by a Network Interface Controller (NIC) that is coupled to the IHS 600 and allows the IHS 600 to communicate via an external network, such as the Internet or a LAN. As illustrated, network controller 611 may be instrumented with a controller or other logic unit 612 that supports a sideband management connection 613 with remote access controller 602. Via the sideband management connection 613, network controller 611 may be configured to operate as a source of telemetry data that may include environmental metrics, such as temperature measurements, and logical sensors, such as metrics reporting input and output data transfer rates.

Processor(s) 601 may also be coupled to a power management unit 614 that may interface with the power system unit of a datacenter in which IHS 600 may be installed. As with network controller 611, power management unit 614 may be instrumented with a controller or other logic unit 615 that supports a sideband management connection 616 with remote access controller 602. Via the sideband management connection 616, power management unit 614 may be configured to operate as a source of telemetry data that may include physical sensors, such as a sensors providing temperature measurements and sensors providing power output measurements, and logical sensors, such as capabilities reporting discrete power settings.

As illustrated, IHS 600 may include one or more FPGA (Field-Programmable Gate Array) card(s) 617. Each FPGA card 617 supported by IHS 600 may include various processing and memory resources, in addition to an FPGA integrated circuit that may be reconfigured after deployment of IHS 600 through programming functions supported by the FPGA card 617. FGPA card 617 may be optimized to perform specific processing tasks, such as specific signal processing, security, data mining, and artificial intelligence functions, and/or to support specific hardware coupled to IHS 600. FPGA card 617 may include one or more physical and/or logical sensors. As specialized computing components, FPGA cards may be used to support large-scale computational tasks that may result in the FPGA card 617 generating significant amounts of heat. In order to protect specialized FPGA cards from damaging levels of heat, FPGA card 617 may be outfitted with multiple temperature sensors. FPGA card 617 may also include logical sensors that are sources of metric data, such as metrics reporting numbers of calculations performed by the programmed circuitry of the FPGA. The FPGA card 617 may also include a management controller 618 that may support interoperation was the remote access controller 602 via a sideband device management bus 619.

In certain embodiments, IHS 600 may operate using a BIOS (Basic Input/Output System) that may be stored in a non-volatile memory accessible by the processor(s) 601. The BIOS may provide an abstraction layer by which the operating system of the IHS 600 interfaces with the hardware components of the IHS. Upon powering or restarting IHS 600, processor(s) 601 may utilize BIOS instructions to initialize and test hardware components coupled to the IHS, including both components permanently installed as components of the motherboard of IHS 600, and removable components installed within various expansion slots supported by the IHS 600. The BIOS instructions may also load an operating system for use by the IHS 600. In certain embodiments, IHS 600 may utilize Unified Extensible Firmware Interface (UEFI) in addition to or instead of a BIOS. In certain embodiments, the functions provided by BIOS may be implemented, in full or in part, by the remote access controller 602.

IHS 600 may include one or more storage controllers 620 that may be utilized to access storage drives 621a-n that are accessible via the chassis in which IHS 600 is installed. Storage controller 620 may provide support for RAID (Redundant Array of Independent Disks) configurations of logical and physical storage drives 612a-n. In some embodiments, storage controller 620 may be an HBA (Host Bus Adapter) that provides more limited capabilities in accessing physical storage drives 621a-n. In some embodiments, storage drives 621a-n may be replaceable, hot-swappable storage devices that are installed within bays provided by the chassis in which IHS 600 is installed. In some embodiments, storage drives 621a-n may also be accessed by other IHSs that are also installed within the same chassis as IHS 600.

In embodiments where storage drives 621a-n are hot-swappable devices that are received by bays of datacenter, the storage drives 621a-n may be coupled to IHS 600 via couplings between the bays of the chassis and a midplane of IHS 600. Storage drives 621a-n may include SAS (Serial Attached SCSI) magnetic disk drives, SATA (Serial Advanced Technology Attachment) magnetic disk drives, solid-state drives (SSDs) and other types of storage drives in various combinations.

In some embodiment, IHS 600 may be used to implement file sharing systems that utilize the Server Message Block (SMB) file sharing protocol. The Server Message Block protocol is a client-server communication protocol used for sharing access to files, and in some cases other resources, over a network. In a file sharing, the SMB protocol provides the inter-process communications that implement protocols for file-level transactions. The SMB protocol is a network file sharing protocol that allows client applications on a user's IHS to setup and conduct remote file level operations, such as reading and writing shared files. In some embodiments, an SMB file sharing system may be implemented using an IHS 600 in which one or more storage drives 621*a-n* are utilized as shared volumes that are used to implement a file system that is shared through use of SMB commands by users of the file sharing system. In some embodiments, the shared volumes of an SMB file sharing system may utilize storage drives on multiple IHSs, such as storage drives 621*a-n* of multiple IHSs that are similarly configured to IHS 600.

As illustrated, storage controller 620 may be instrumented with a controller or other logic unit 622 that supports a sideband management connection 623 with remote access controller 602. Via the sideband management connection 623, storage controller 620 may be configured to operate as a source of telemetry data regarding the operation of storage drives 621*a-n*. For instance, controller 622 may collect metric data characterizing the performance of individual storage drives 621*a-n*, such as available storage capacity and data transfer rates, as well as environmental properties, such as storage drive temperatures. In some embodiments, a storage controller 620 may be utilized in implementing an fille sharing system that utilizes one of more of storge drives 621*a-n* as shared volumes. In such embodiments, storage controller 620 may monitor SMB commands received from users of the file sharing system. As described below, this collected SMB data may be used to compile a profile of normal file sharing activity by individual users, which may then be used to detect anomalous file sharing activity by that user that is consistent with a ransomware attack. In some embodiments, storage controller 620 may track and maintain a record of recent SMB commands issued by a user of IHS 600, in some instances tracking all SMB commands by a user during an ongoing SMB session. In such embodiments, the session data monitored and collected by storage controller 620 may be used to reverse all SMB commands by a user during and SMB session, such as in response to detecting a ransomware pattern in the SMB commands issued by the user.

In certain embodiments, remote access controller 602 may operate from a different power plane from the processors 601 and other components of IHS 600, thus allowing the remote access controller 602 to operate, and management tasks to proceed, while the processing cores of IHS 600 are powered off. As described, various functions provided by the BIOS, including launching the operating system of the IHS 600, may be implemented by the remote access controller 602. In some embodiments, the remote access controller 602 may perform various functions to verify the integrity of the IHS 600 and its hardware components prior to initialization of the IHS 600 (i.e., in a bare-metal state).

In some embodiments, remote access controller 602 may also be directly coupled via I2C couplings 624 with one or more sensors 625, such as sensors that provide measurements of ambient inlet temperatures, outlet airflow temperatures and temperatures at various locations within IHS 600. Sensors 625 coupled directly to remote access controller 602 may also be used in implementing security protocols, such as intrusion detection sensors and user proximity sensors.

Remote access controller 602 may include a service processor 626, or a specialized microcontroller, that operates management software that supports remote monitoring and administration of IHS 600. Remote access controller 602 may be installed on the motherboard of IHS 600 or may be coupled to IHS 600 via an expansion slot provided by the motherboard. In support of remote monitoring functions, network adapter 627 may support connections with remote access controller 602 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 602 may support monitoring and administration of various managed devices 611, 614, 617, 620, 625 of an IHS via a sideband bus interface. For instance, messages utilized in device management may be transmitted using I2C sideband bus connections that may be individually established with each of the respective managed devices 611, 614, 617, 620, 625 through the operation of an I2C multiplexer 628 of the remote access controller. As illustrated, certain of the managed devices of IHS 600, such as FPGA cards 617, network controller 611, storage controller 620 and power management unit 614, are coupled to the IHS processor(s) 601 via an in-line bus 608, such as a PCIe root complex, that is separate from the I2C sideband bus connections 613, 616, 619, 623, 624 used for device management.

In certain embodiments, the service processor 626 of remote access controller 602 may rely on an I2C co-processor 629 to implement sideband I2C communications between the remote access controller 602 and managed components 611, 614, 617, 620, 625 of the IHS. The I2C co-processor 629 may be a specialized co-processor or micro-controller that is configured to interface via a sideband I2C bus interface with the managed hardware 611, 614, 617, 620, 625 of IHS. In some embodiments, the I2C co-processor 629 may be an integrated component of the service processor 626, such as a peripheral system-on-chip feature that may be provided by the service processor 626. Each I2C bus is illustrated as single line in FIG. 6. However, each I2C bus 613, 616, 619, 623, 624 may be comprised of a clock line and data line that couple the remote access controller 602 to 12C endpoints 612, 615, 618, 622 on each of the managed components.

In various embodiments, an IHS 600 does not include each of the components shown in FIG. 6. In various embodiments, an IHS 600 may include various additional components in addition to those that are shown in FIG. 6. Furthermore, some components that are represented as separate components in FIG. 6 may in certain embodiments instead be integrated with other components. For example, in certain embodiments, all or a portion of the functionality provided by the illustrated components may instead be provided by components integrated into the one or more processors 601 as a systems-on-a-chip.

In an example embodiment, a method for vulnerability redemption comprises extracting vulnerability details from a vulnerability report regarding an information handling system (IHS), constructing a bot query based on the vulnerability details, receiving a vulnerability resolution script from a bot in response to the bot query, triggering execution of the vulnerability resolution script on the IHS, receiving an indication of successful execution of the vulnerability resolution script on the IHS, and saving the vulnerability resolution script to a remediation database. The method may further comprise receiving an indication of failure of the resolution script from the IHS, constructing a revised bot query with resolution script failure details, receiving an updated vulnerability resolution script from the bot in response to the revised bot query, triggering execution of the updated vulnerability resolution script on the IHS, and receiving the indication of successful execution in response to the updated vulnerability resolution script.

The vulnerability details may comprise one or more of: an affected IHS name, an affected IHS IP address, operating system information, recommended fix details for remediation of the vulnerability. The vulnerability details may identify risks of one or more cyber attacks, exploits, or malware directed at the IHS. The bot may be a publicly available autonomous artificial-intelligence (AI) application.

The method may further comprise performing multiple iterations of constructing revised bot queries, receiving updated vulnerability resolution scripts, and triggering execution of the updated vulnerability resolution scripts on the IHS until the indication of successful execution of the vulnerability resolution script is received.

The method may further comprise checking the remediation database for a resolution script associated with the bot query and/or associated with the vulnerability details.

The method may further comprise updating the remediation database with one or more of: an indication of execution success or failure, time taken for execution of the resolution script, and disruptive actions on the IHS associated with execution of the resolution script.

The method may further comprise calculating a solution effectiveness score for the vulnerability resolution script.

In another example embodiment, a method for managing vulnerability redemption scripts includes receiving an indication of successful execution of a vulnerability resolution script on an affected IHS, wherein the vulnerability resolution script is received from a bot in response to a query constructed from a vulnerability report associated with the affected IHS, saving the vulnerability resolution script to a remediation database, and calculating a solution effectiveness score for the vulnerability resolution script. The solution effectiveness score may include one or more of: an execution time score, a disruption score, a platform supported score, and a solution utilization score. The disruption score may be based upon whether an IHS reboot was required, a number of reboots required, whether a service restart was required, and whether a user logout was required. The platform supported score may be based upon a number of platforms supported and/or a number of platform versions supported. The solution utilization score may be based on a number of times that the vulnerability resolution script is used and the number of platforms that utilize the vulnerability resolution script. The vulnerability resolution script may be generated after multiple iterations of bot queries.

In a further example embodiment, a method for training a vulnerability remediation engine includes storing a remediation solution script in a remediation database, determining whether an alternate solution is available in the database for a particular vulnerability addressed by the remediation solution script, if no alternate solution is available, sending the remediation solution script to a bot with a query for an improved solution script, and saving a revised solution script to the remediation database for the particular vulnerability. The method may further comprise randomly selecting between the remediation solution script and the revised solution script to fix the particular vulnerability.

The method may further include sending the remediation solution script to a different bot with a query for an additional improved solution script, saving an additional revised solution script to the remediation database for the particular vulnerability, and randomly selecting between multiple available solution scripts to fix the particular vulnerability.

The method may further include calculating a solution effectiveness score for the solution scripts.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method for vulnerability redemption, comprising:

extract vulnerability details from a vulnerability report regarding a vulnerability associated with an Information Handling System (IHS);

construct a bot query based on the vulnerability details;

receive, in a bot response, a vulnerability resolution script from a bot in response to the bot query;

extract one or more executable code snippets from the bot response and save the one or more executable code snippets to a script file at a script file path;

sanitize, using an AI-based service or chatbot, the script file to generate a sanitized vulnerability resolution script;

trigger execution of the sanitized vulnerability resolution script on the IHS;

receive an indication of successful execution of the sanitized vulnerability resolution script on the IHS;

trigger, using an application programming interface (API), a vulnerability scan of the IHS to validate remediation of the vulnerability; and save the sanitized vulnerability resolution script and the script file path to a remediation database as an approved solution in response to successful validation of the remediation.

2. The method of claim 1, further comprising:

receive an indication of failure of execution of the sanitized vulnerability resolution script from the IHS;

construct a revised bot query with resolution script failure details;

receive, in an updated bot response, an updated vulnerability resolution script from the bot in response to the revised bot query;

extract one or more updated executable code snippets from the updated bot response and save the one or more updated executable code snippets to an updated script file at an updated script file path;

sanitize, using the AI-based service or chatbot, the updated script file to generate a sanitized updated vulnerability resolution script;

trigger execution of the sanitized updated vulnerability resolution script on the IHS; and receive the indication of successful execution in response to the sanitized updated vulnerability resolution script.

3. The method of claim 2, further comprising:

perform multiple iterations of constructing revised bot queries, receiving updated vulnerability resolution scripts, and triggering execution of the updated vulnerability resolution scripts on the IHS up to a predetermined number of iterations, until the indication of successful execution of the vulnerability resolution script is received.

4. The method of claim 2, further comprising:

update the remediation database with one or more of: an indication of execution success or failure, time taken for the execution, and disruptive actions on the IHS associated with the execution.

5. The method of claim 1, wherein the vulnerability details comprise one or more of: an affected IHS name, an affected IHS IP address, operating system information, recommended fix details for remediation of the vulnerability.

6. The method of claim 1, wherein the vulnerability details identify risks of one or more cyber attacks, exploits, or malware directed at the IHS.

7. The method of claim 1, wherein the bot is a publicly available autonomous artificial-intelligence (AI) application.

8. The method of claim 1, further comprising:

check the remediation database for a resolution script associated with the bot query.

9. The method of claim 1, further comprising:

check the remediation database for a resolution script associated with the vulnerability details.

10. The method of claim 1, further comprising:

calculate a solution effectiveness score for the vulnerability resolution script.

11. A method for managing vulnerability redemption scripts, comprising:

receive an indication of successful execution of a sanitized vulnerability resolution script on an affected Information Handling System (IHS), wherein a vulnerability resolution script is received from a bot in response to a query constructed from a vulnerability report concerning a vulnerability associated with the affected IHS and sanitized, using an AI-based service or chatbot, prior to execution;

in response to the indication of successful execution of the sanitized vulnerability resolution script, trigger a vulnerability scan of the IHS to validate remediation of the vulnerability:

in response to successful validation of the remediation, save the sanitized vulnerability resolution script to a remediation database as an approved solution, save, in association with the approved solution, a script file path of a script file containing executable code snippets extracted from a bot response; and calculate a solution effectiveness score for the sanitized vulnerability resolution script.

12. The method of claim 11, wherein the solution effectiveness score comprises one or more of: an execution time score, a disruption score, a platform supported score, and a solution utilization score.

13. The method of claim 12, wherein the disruption score is based upon whether an IHS reboot was required, a number of reboots required, whether a service restart was required, and whether a user logout was required.

14. The method of claim 12, wherein the platform supported score is based upon a number of platforms supported and/or a number of platform versions supported.

15. The method of claim 12, wherein the solution utilization score is based on a number of times that the sanitized vulnerability resolution script is used and a number of platforms that utilize the sanitized vulnerability resolution script.

16. The method of claim 12, wherein the sanitized vulnerability resolution script is generated after multiple iterations of bot queries including revised bot queries that include resolution script failure details comprising a failure summary and/or error codes, the multiple iterations cycling up to a predetermined number of iterations.

* * * * *